(12) United States Patent
Mack

(10) Patent No.: US 8,061,719 B2
(45) Date of Patent: Nov. 22, 2011

(54) LOCKABLE DRILL CHUCK

(75) Inventor: Hans-Dieter Mack, Sontheim (DE)

(73) Assignee: Roehm GmbH, Sontheim (DE)

( * ) Notice: Subject to any disclaimer, the term of this patent is extended or adjusted under 35 U.S.C. 154(b) by 1046 days.

(21) Appl. No.: 11/900,580

(22) Filed: Sep. 12, 2007

(65) Prior Publication Data

US 2008/0067761 A1    Mar. 20, 2008

(30) Foreign Application Priority Data

Sep. 14, 2006  (DE) .......................... 10 2006 043 040

(51) Int. Cl.
*B23B 31/16* (2006.01)
(52) U.S. Cl. ........................... 279/62; 279/140; 279/902
(58) Field of Classification Search .............. 279/60–62, 279/140, 902
See application file for complete search history.

(56) References Cited

U.S. PATENT DOCUMENTS

| | | | | | |
|---|---|---|---|---|---|
| 3,948,534 | A | * | 4/1976 | Schnizler et al. ................ | 279/62 |
| 4,958,840 | A | * | 9/1990 | Palm ................................. | 279/62 |
| 5,145,192 | A | * | 9/1992 | Rohm ................................ | 279/62 |
| 5,171,030 | A | * | 12/1992 | Rohm ................................ | 279/63 |
| 5,172,923 | A | * | 12/1992 | Nakamura ........................ | 279/62 |
| 5,174,588 | A | * | 12/1992 | Reibetanz et al. .............. | 279/62 |
| 5,322,303 | A | * | 6/1994 | Nakamura ........................ | 279/62 |
| 5,390,940 | A | * | 2/1995 | Morlino et al. .................. | 279/62 |
| 5,435,578 | A | * | 7/1995 | Rohm ................................ | 279/62 |
| 5,499,829 | A | * | 3/1996 | Rohm ................................ | 279/62 |
| 5,624,125 | A | * | 4/1997 | Rohm ................................ | 279/62 |
| 5,765,839 | A | | 6/1998 | Rohm | |
| 6,073,939 | A | * | 6/2000 | Steadings et al. .............. | 279/62 |
| 6,889,986 | B2 | * | 5/2005 | Rohm ................................ | 279/62 |
| 7,360,770 | B2 | * | 4/2008 | Luckenbaugh et al. ........ | 279/62 |
| 2007/0182108 | A1 | * | 8/2007 | Mack ............................... | 279/60 |

* cited by examiner

*Primary Examiner* — Eric A Gates
(74) *Attorney, Agent, or Firm* — Andrew Wilford

(57) ABSTRACT

A drill chuck has a chuck body centered on and rotatable about an axis and formed with angled guides and respective jaws slidable in the guides axially forward and radially toward each other and axially rearward and radially away from each other. An annular tightening element is limitedly axially shiftable on the sleeve between a front position and a rear position. Screwthreads engaged between the element and the jaws axially displace the jaws forward on rotation of the element in a tightening direction and axially displace the jaws rearward on rotation of the element in an opposite loosening direction. Respective annular arrays of teeth angularly fixed on the element and the body are interengaged and prevent relative rotation of the element and body in the rear position of the element and are spaced and permit relative rotation of the element and body in the front position of the element.

13 Claims, 7 Drawing Sheets

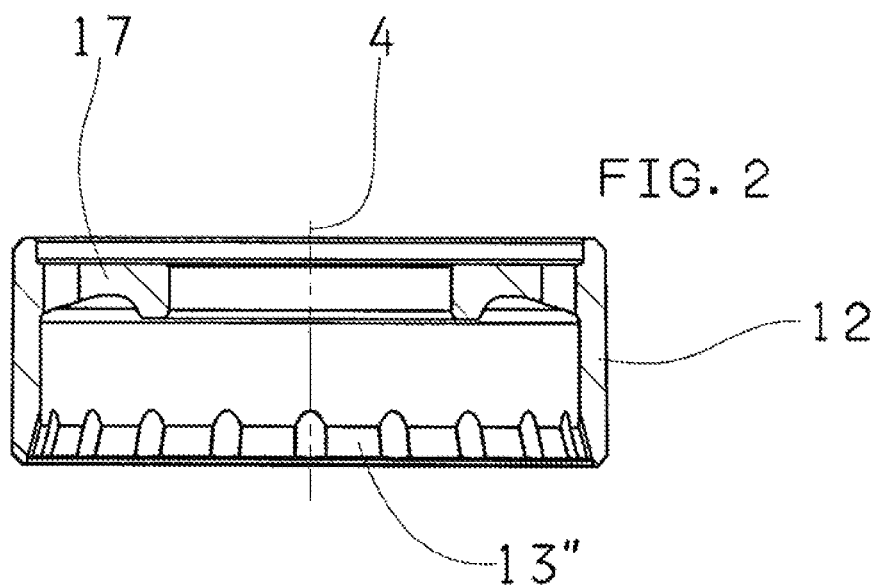
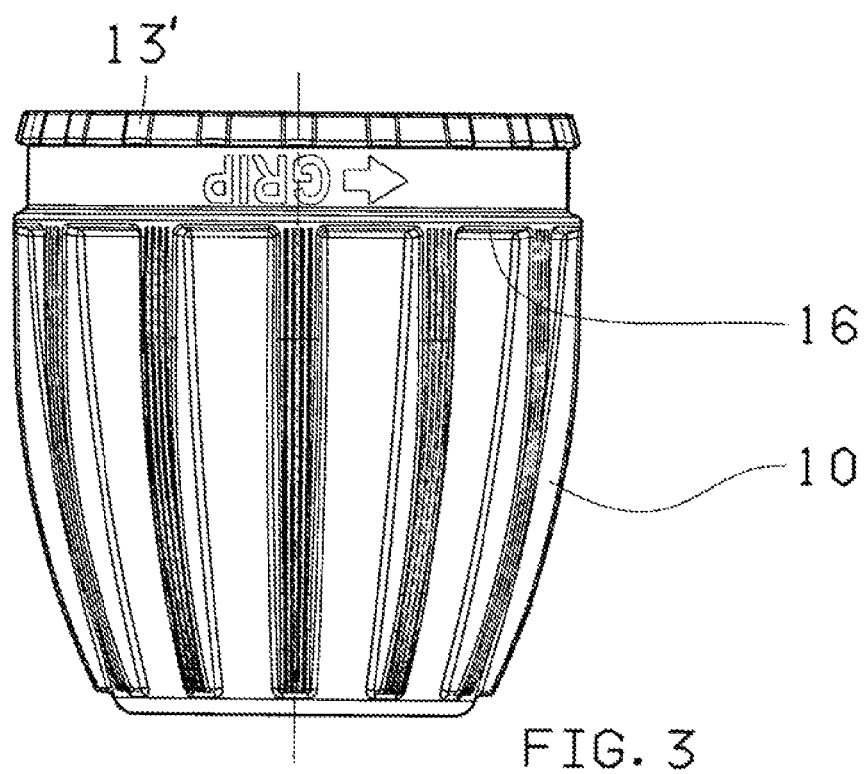

LOCKABLE DRILL CHUCK

FIELD OF THE INVENTION

The present invention relates to a chuck. More particularly this invention concerns a lockable drill chuck.

BACKGROUND OF THE INVENTION

A drill chuck described in U.S. Pat. No. 5,765,839 has a body provided centered on an axis with an annular array of teeth and a plurality of jaws radially displaceable relative to the body between inner and outer positions. A tightening ring is axially fixed but rotatable about the axis on the body in a tightening direction and in an opposite loosening direction and a pair of screwthread formations between the tightening ring and the jaws move the jaws radially together on rotation of the tightening ring in the tightening direction and radially apart on rotation of the tightening ring in the loosening direction. A locking member engageable with the teeth and angularly fixed on the tightening ring is radially displaceable between a locking position engaging the teeth and preventing rotation of the ring in the loosening direction and a freeing position permitting free relative rotation of the body and the ring. A setting ring angularly displaceable on the tightening ring is formed with a pair of angularly spaced and radially open seats. A pair of angularly spaced abutments between the setting ring and the tightening ring limit angular movement of the sleeve on the ring. A cam on the setting ring is engageable with the locking member for displacing the locking member into the locking position when the setting ring is in one of its end positions and for displacing the locking member into the freeing position when the setting ring is in the other of its end positions.

Such a drill chuck has proven very satisfactory in practice, and consequently has been manufactured and marketed in very high volume. However, due to the presence of a locking device this drill chuck also has a relatively complex design that is costly to manufacture for use on a high-powered hammer drill.

OBJECTS OF THE INVENTION

It is therefore an object of the present invention to provide an improved lockable drill chuck.

Another object is the provision of such an improved lockable drill chuck that overcomes the above-given disadvantages, in particular that is of simple design, yet that locks safely and surely.

SUMMARY OF THE INVENTION

A drill chuck has according to the invention a chuck body centered on and rotatable about an axis and formed spaced angularly around the axis with a plurality of angled guides and respective jaws slidable in the guides axially forward and radially toward each other and axially rearward and radially away from each other. An annular tightening element is limitedly axially shiftable on the sleeve between a front position and a rear position. Screwthreads engaged between the element and the jaws axially displace the jaws forward on rotation of the element in a tightening direction and axially displace the jaws rearward on rotation of the element in an opposite loosening direction. Respective annular arrays of teeth angularly fixed on the element and the body are interengaged and prevent relative rotation of is the element and body in the rear position of the element and are spaced and permit relative rotation of the element and body in the front position of the element.

With this system, therefore, when the jaws are pushed back, as naturally occurs when they are tightly gripping a tool and when they are holding a bit that is drilling into something, the teeth are in mesh and the chuck cannot loosen. When the jaws are not pushing backward, a simple opposite turn of the sleeve will shift the parts enough to separate the teeth and allow the chuck to be opened. Operation is intuitive and natural, and the structure is very simple. Safe engagement of the locking teeth of the annular disk and the tightening sleeve with one another is also enhanced by the fact that when the clamping jaws make contact with the shaft of the drill, the tightening sleeve assumes an off-center stable position under the effect of cooperation, which is not 100% symmetrical, of the annular thread with the row of teeth of the clamping jaws.

It is particularly preferred within the scope of the invention when the threaded ring is axially rearwardly supported on the chuck body by means of an elastic pressure ring that holds lo the element in place while still allowing it the necessary limited axial movement to mesh and demesh the teeth. This ring can be a simple spring-steel washer with an inner periphery set in the chuck body and an outer periphery bearing axially forward on the tightening element, or with an outer periphery set in the tightening element and an inner periphery bearing axially rearward on the chuck body.

With regard to a simple design of the chuck body, it is also advantageous when the threaded ring is designed as a one-piece ring, and is axially supported toward the front by the tightening sleeve that is secured to the chuck body.

It is very particularly preferred within the scope of the invention when the locking teeth are mounted on a surface of frustoconical shape, since only a relatively small displacement in the axial direction is thereby necessary to mesh the locking teeth over a relatively great distance.

The annular disk may also be situated at an axially rearward spacing from the end of the chuck body in order to make better use of space when connection is made to a drill.

In that case the annular disk may have through openings for the clamping jaws.

To simplify clamping of the drill chuck, the annular disk is expanded by means of an axial plate collar to form a grip sleeve.

Within the scope of the invention, the locking teeth of the grip sleeve may project radially inward on the grip sleeve, thereby overlapping the radially outwardly projecting locking teeth of the tightening sleeve and encapsulating same before the user is provided with access. This also allows conducting surfaces for the drilling dust to be provided in the tightening sleeve that ensure that any drilling dust arising during operation of the drill, in particular during overhead operation, is deflected away from the locking teeth.

Alternatively, the locking teeth of the annular disk may have a radially outward design on the annular disk, thereby being overlapped by the tightening sleeve, which at the same time assumes the function of the conducting surfaces.

It has also been shown to be advantageous when at least one of the locking teeth of the annular disk and of the tightening sleeve is provided on a ring having increased wear resistance that is connected in a angularly fixed manner to the annular disk or the tightening sleeve. This design allows another economical or easily processed material to be selected for the annular disk or tightening sleeve, and this material then accommodates the ring having increased wear resistance, which preferably is made of metal.

Of course, it is also possible for the annular disk and/or the tightening sleeve to be made of metal.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIG. 2 is a longitudinal section through the insulated grip sleeve;

FIG. 3 is a side view of an insulated tightening sleeve;

SPECIFIC DESCRIPTION

Figure 1:
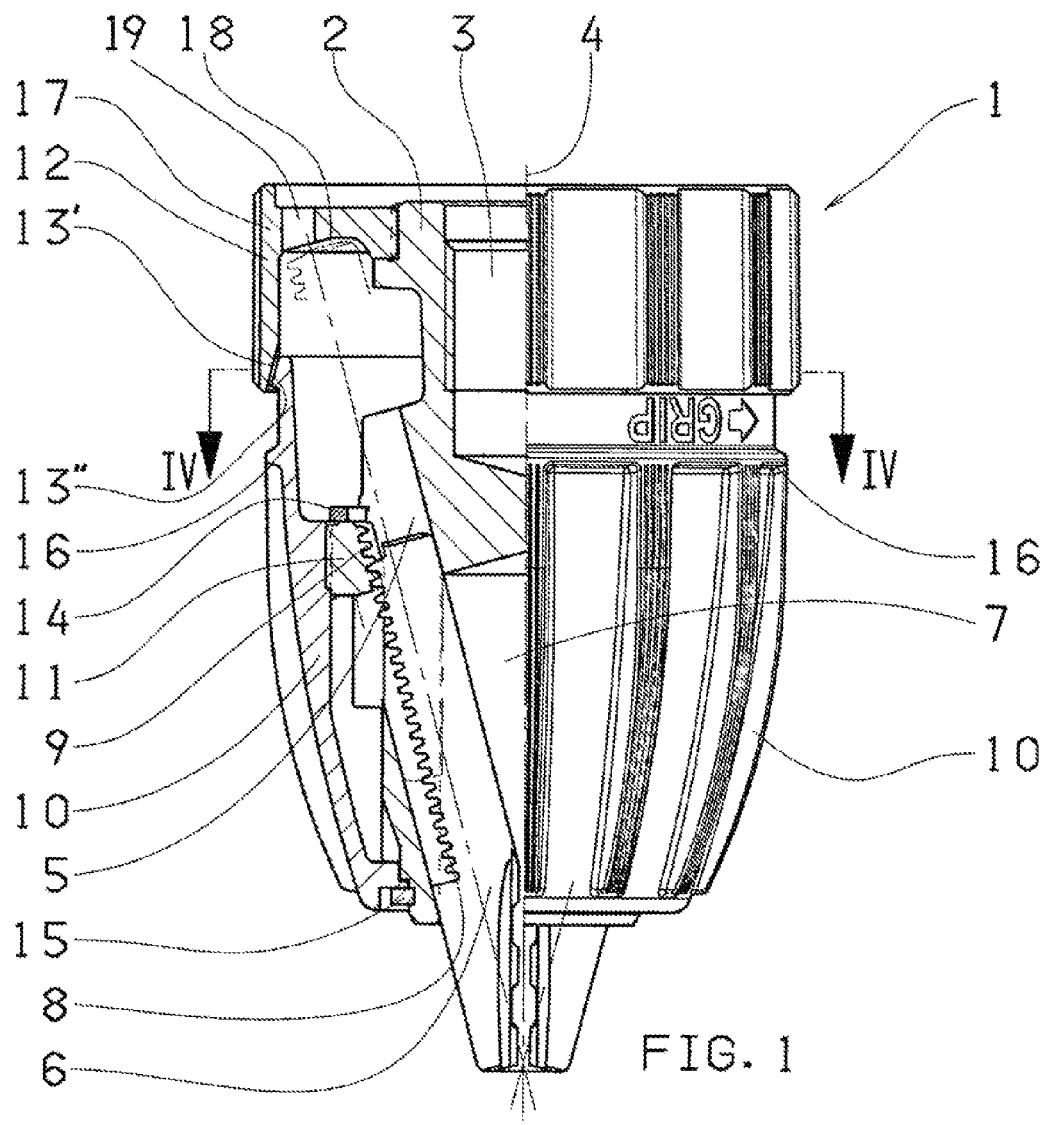
FIG. 1 is a side view of a drill chuck according to the invention, with the left half illustrated in longitudinal section.
Figure 4A:
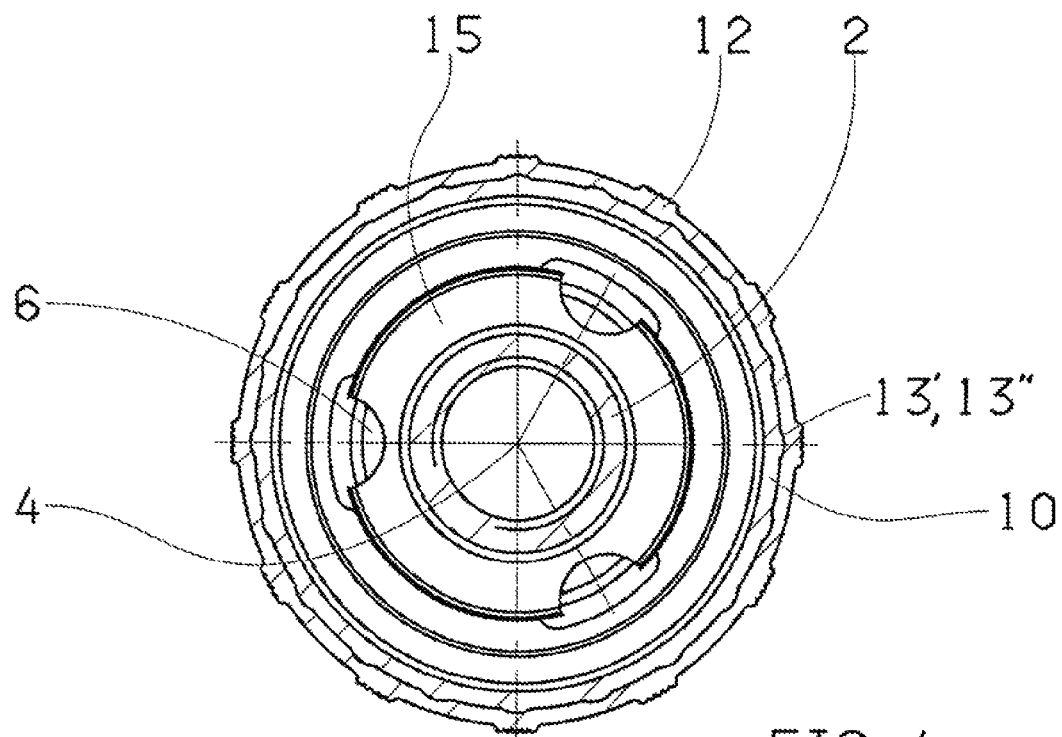
FIG. 4a is a section taken along line IV-IV of FIG. 1 with the locking teeth engaged.
Figure 4B:
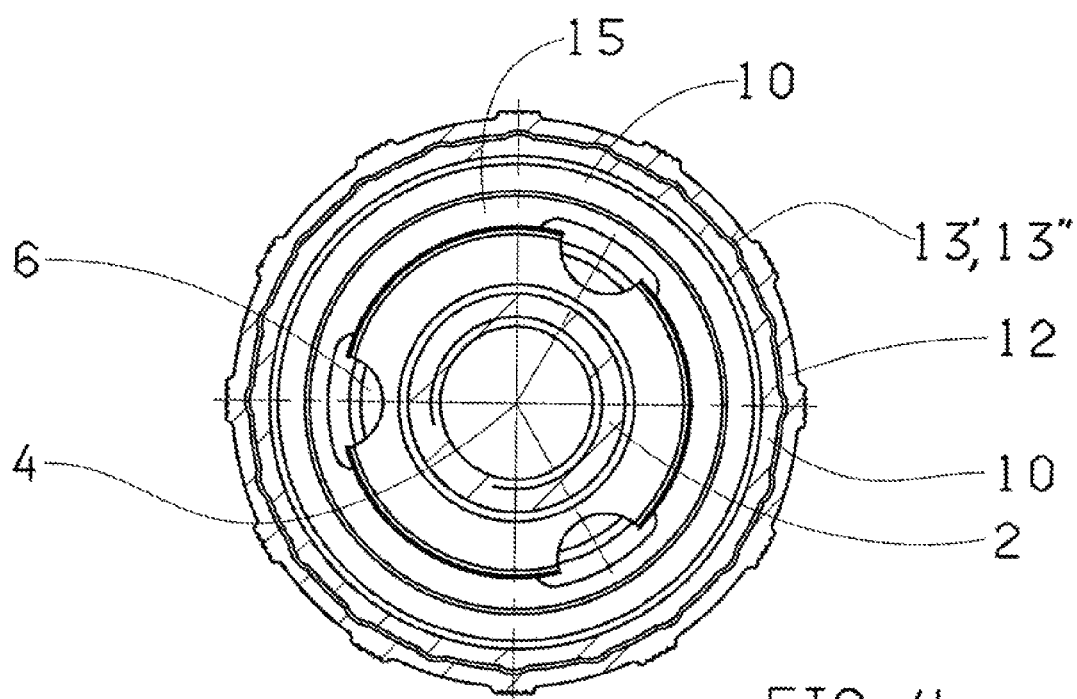
FIG. 4b is the same section in a position with play between the locking teeth for allowing relative rotation of the grip sleeve and the tightening sleeve.
Figure 4C:
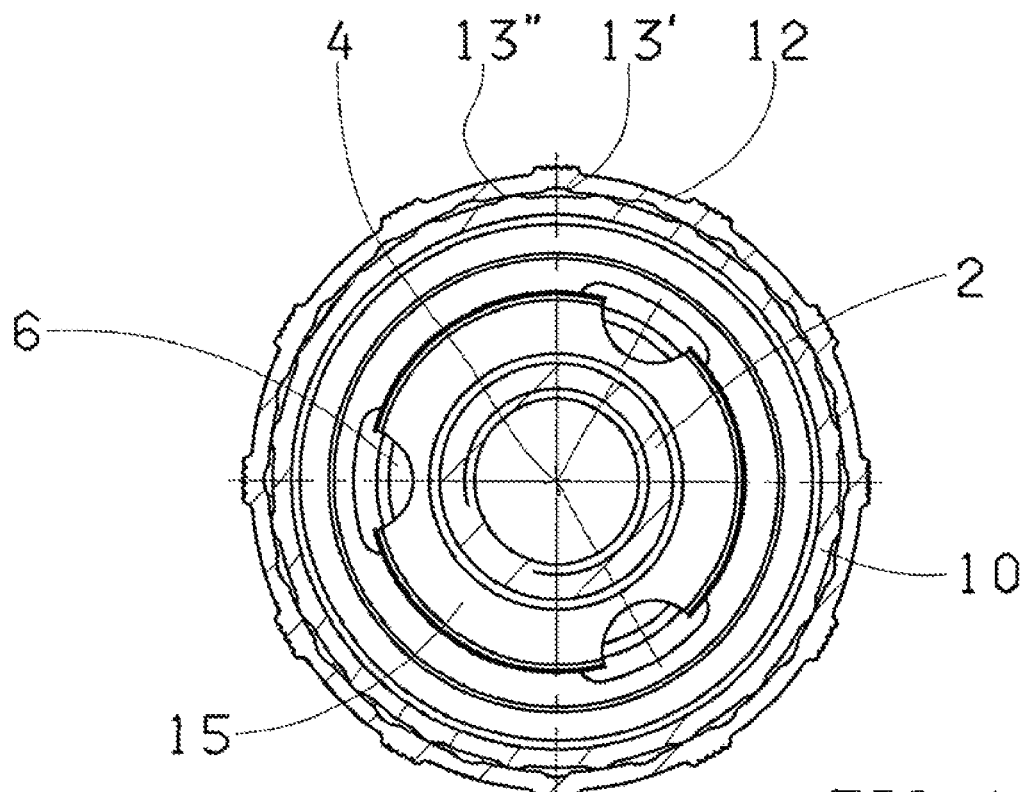
FIG. 4c is the same section with the locking teeth of the tightening sleeve between the locking seats of the grip sleeve.
Figure 4D:
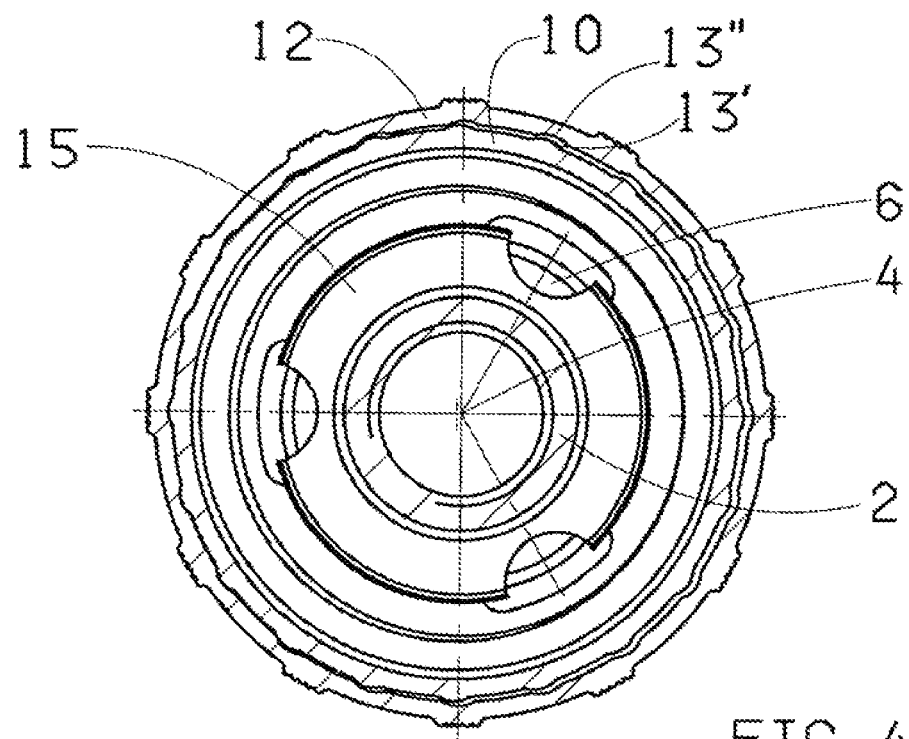
FIG. 4d is the same section with the tightening-sleeve teeth engaged with the grip-sleeve teeth.
Figure 6:
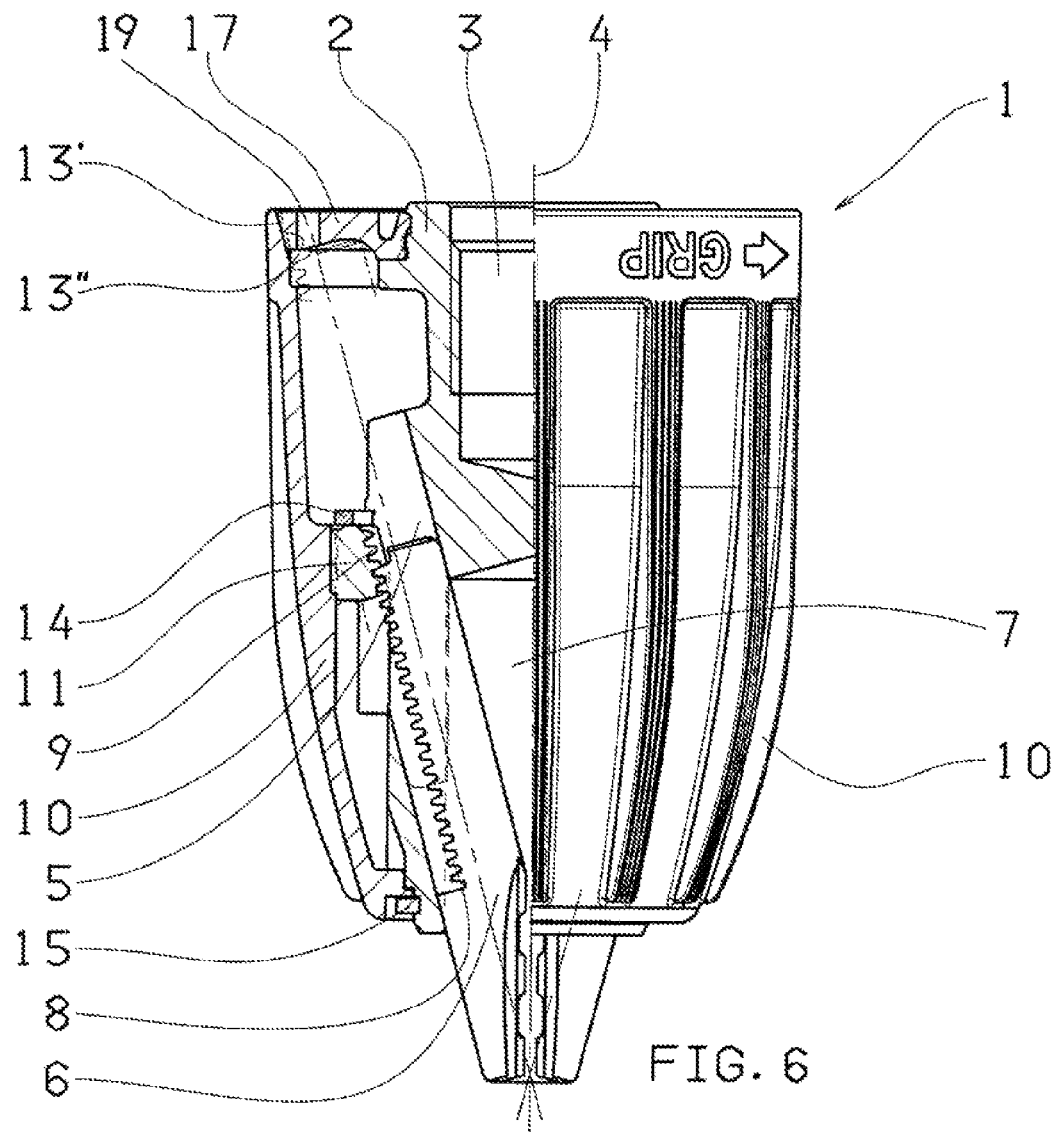
Figure 7:
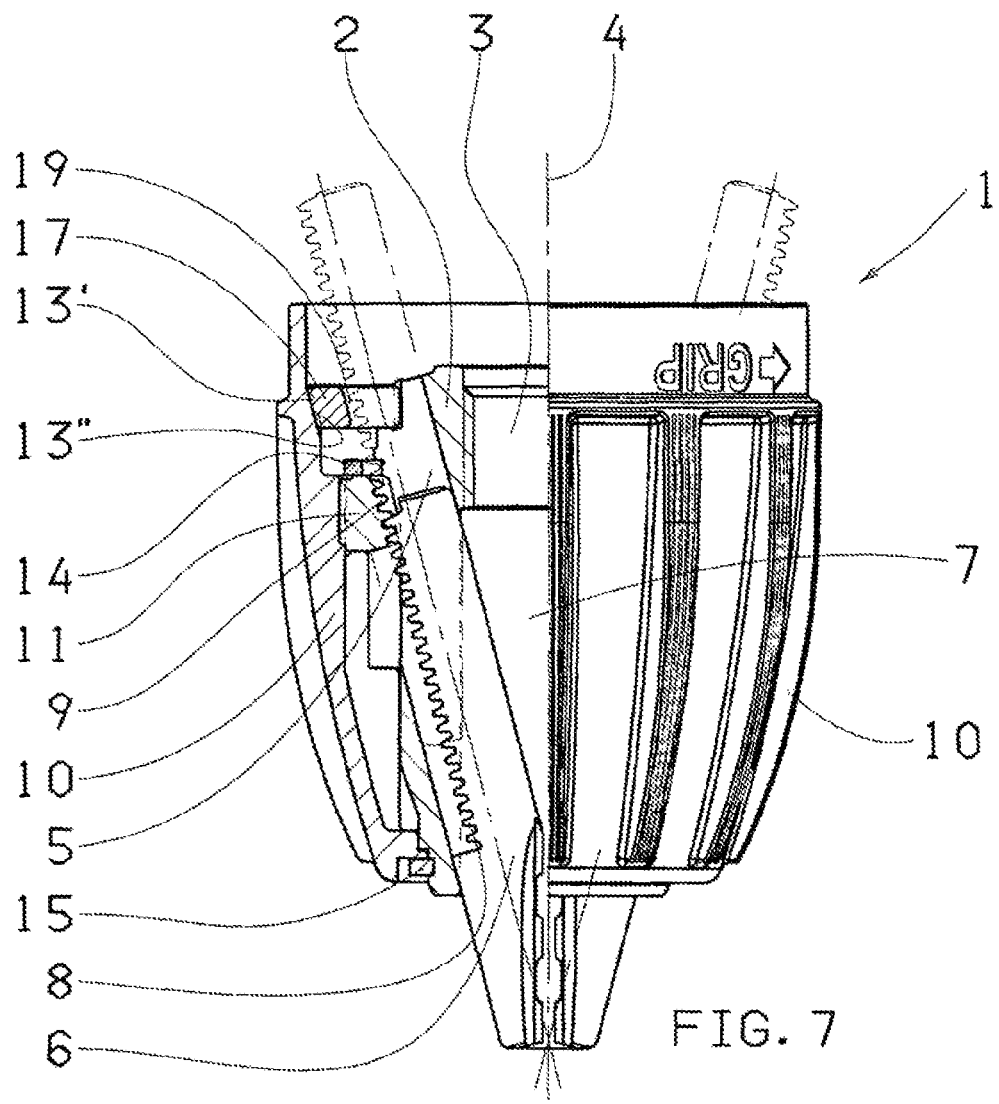

As seen in FIG. 1 a drill chuck 1 has a chuck body 2 that on the axially rearward end has a threaded hole 3 for a spindle of a drill, not illustrated in the drawing. In addition, clamping jaws 6 are longitudinally slidable in guides 5 running at a small acute angle to a chuck axis 4, and open into a tool seat 7 provided at the axial front end of the chuck body 2. The clamping jaws 6 each have a radially outwardly projecting row of teeth 8 engaging in an annular screwthread 9 of a threaded tightening ring 11 that is angularly and axially fixed on a tightening sleeve 10 rotatable and limitedly axially shiftable on the chuck body 2. Also fixed both axially and angularly on the chuck body 2 is a grip sleeve 12 (FIGS. 1-5) or an annular disk 17 (FIGS. 6 and 7), that may also be molded in one piece with the chuck body 2. The sleeve 12 has a flat rear flange 18 fixed to the body 2 and rearwardly closing the guide passages 5. Either the disk 17 or the flange 18 is formed with axially throughgoing holes 19 through which drilling dust can exit. In addition FIG. 7 shows how the holes 19 are enlarged so that the jaws 6 can pass through them and are not blocked in their rearward travel.

According to the invention the tightening sleeve 10 is formed at its axial rear end, which is of frustoconical shape, with an annular array of generally radially outwardly directed but angled teeth 13' and the grip sleeve 12 is formed inside its axial front end, which is of complementary frustoconical shape, with a complementary annular array of generally radially inwardly directed teeth 13" fittable with the teeth 13'. The teeth 13' and 13" are dimensioned relative to the limited axial travel of the sleeve 10 on the body 2 such that they can be engaged or disengaged. More particularly when the sleeve 10 is pushed forward, the teeth 13' and 13" are largely disengaged, at most touching as they angularly pass each other to make a ratcheting sound. When the sleeve 10 is pushed back, which invariably happens when the jaws 6 are bearing on a tool, the teeth 13' and 13" engage solidly in each other and prevent any rotation of the sleeve 10 (and with it the ring 11) so that the chuck 1 cannot loosen. The action is natural and intuitive: the user naturally pushes the sleeve 10 axially forward when gripping and turning it, and the rearward force of drilling naturally pushes the sleeve 10 back to lock it.

This axial displacement of the tightening sleeve 10 is facilitated by the fact that the threaded ring 11 is axially rearwardly braced on the chuck body 2 by an elastically deformable washer or pressure ring 14. The threaded ring 11 itself is designed as a one-piece threaded ring 11, and is axially forwardly braced against a shoulder of the tightening sleeve 10 that is in turn braced axially forward on the chuck body 2 by a snap ring 15 shown in FIG. 1.

Figure 5:
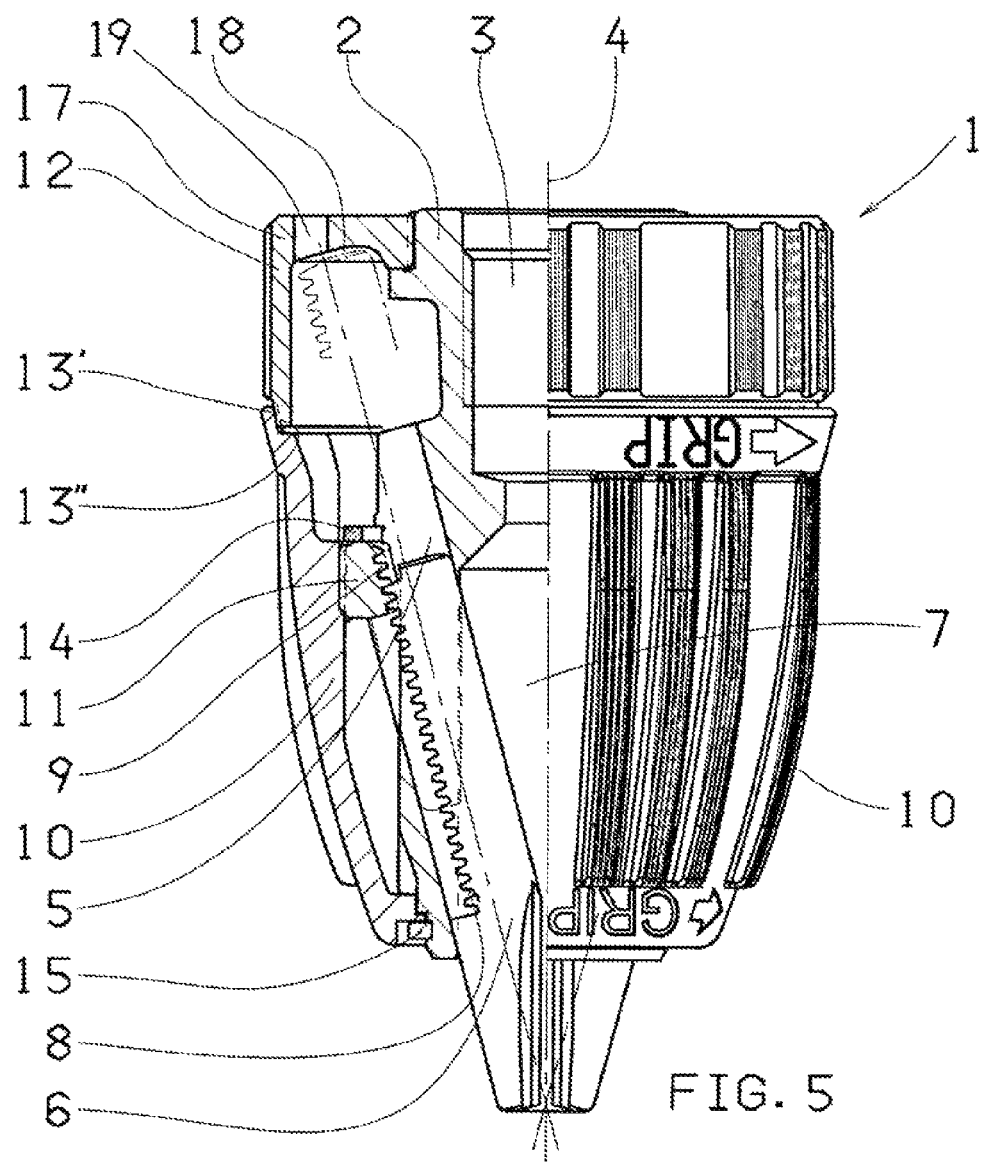
FIGS. 5, 6, and 7 are views like FIG. 1 of variations on the drill chuck according to the invention.

Whereas in FIGS. 1-3 the arrays of locking teeth 13' and 13" are frustoconical with the teeth 13' inside the teeth 13", in FIG. 5 the locking teeth 13' and 13" of the grip sleeve and the tightening sleeve 10 are oppositely oriented, that is with the teeth 13' facing outward and the teeth 13" facing inward.

The embodiment of FIG. 1 has internal surfaces 16 on the tightening sleeve 10 for guiding drilling dust so that it does not get between the locking teeth 131 and 13", since this drilling dust could damage the play between the locking teeth 13' and 13".

According to one illustrated embodiment not illustrated in the drawings, it is of course possible for the locking teeth 13"1 of the grip sleeve 12 and/or the teeth 13' of the tightening sleeve 10 to be provided on a ring having increased wear resistance, in particular made of metal, which is angularly fixed to the grip sleeve 12 or the tightening sleeve 10, which itself may be made of plastic.

For tightening a drill chuck 1, the starting point is the opened state of the drill chuck, in which play is provided between the locking teeth 13' and 13". When a drill bit is chucked, the clamping jaws 6 make contact with it and are axially rearwardly pressed against the threaded ring 11, causing the pressure ring 14 to elastically deform. This allows the threaded ring 11 together with the tightening sleeve 10 to move axially rearward. The locking teeth 13' and 13" engage and lock the angular position of the tightening sleeve 10 with respect to the chuck body 2. When the teeth 13' and 13" fit together (FIG. 4d), the tightening sleeve 10 is locked on the body 2.

I claim:

1. A drill chuck comprising:
    a chuck body centered on and rotatable about an axis and formed spaced angularly around the axis with a plurality of angled guides;
    respective jaws slidable in the guides axially forward and radially toward each other and axially rearward and radially away from each other;
    an annular tightening element limitedly axially shiftable on the body between a front position and a rear position;
    screwthread formations engaged between the element and the jaws for axially displacing the jaws forward on rotation of the element in a tightening direction and for axially displacing the jaws rearward on rotation of the element in a loosening direction; and
    respective annular arrays of teeth angularly fixed on the element and the body, the arrays being interengaged and preventing relative rotation of the element and body in the rear position of the element and being spaced and permitting relative rotation of the element and body in the front position of the element.

2. The drill chuck defined in claim 1, further comprising an elastic biasing ring engaged between the element and the body and urging the element axially forward into the front position.

3. The drill chuck defined in claim 1 wherein the element includes a ring formed with one of the screwthread formations and a sleeve surrounding and fixed to the ring and formed with the respective array of teeth.

4. The drill chuck defined in claim 3 wherein the ring is one piece.

5. The drill chuck defined in claim 4 wherein the element has an axial rear end formed with the respective frustoconical surface and array of teeth.

6. The drill chuck defined in claim 1 wherein the body and element have generally complementary substantially frustoconical surfaces confronting each other and carrying the respective arrays of teeth.

7. The drill chuck defined in claim 6 wherein the chuck body or the tightening element is provided with a hardened ring forming the respective surface and array of teeth.

8. The drill chuck defined in claim 7 wherein the hardened ring is metal.

9. The drill chuck defined in claim 1 wherein the chuck body includes at a rear end a radial projection.

10. The drill chuck defined in claim 9 wherein the radial projection is formed as a plate and has an outer edge formed with the respective array of teeth.

11. The drill chuck defined in claim 9 wherein the chuck body further includes a grip sleeve projecting axially forward from an outer edge of the projection and itself formed with the respective array of teeth.

12. The drill chuck defined in claim 11 wherein the grip sleeve has an axial front end formed with the respective array of teeth.

13. The drill chuck defined in claim 1 wherein the chuck body or the tightening element are of metal.

* * * * *